(12) United States Patent (10) Patent No.: US 11,747,148 B2
Wartusch et al. (45) Date of Patent: Sep. 5, 2023

(54) PARKING ASSISTANCE APPARATUS FOR AIDING A DRIVER OF A MOTOR VEHICLE WITH A PARKING PROCESS

(71) Applicant: Continental Teves AG & Co. oHG, Frankfurt am Main (DE)

(72) Inventors: Benedikt Wartusch, Hofheim am Taunus (DE); Ahmed Hamdy Gad, Frankfurt am Main (DE); Ahmed Barakat, Griesheim (DE)

(73) Assignee: Continental Teves AG & Co. oHG

( * ) Notice: Subject to any disclaimer, the term of this patent is extended or adjusted under 35 U.S.C. 154(b) by 122 days.

(21) Appl. No.: 16/785,898

(22) Filed: Feb. 10, 2020

(65) Prior Publication Data

US 2020/0284589 A1  Sep. 10, 2020

(30) Foreign Application Priority Data

Mar. 8, 2019  (DE) ...................... 10 2019 203 187.0

(51) Int. Cl.
*G01C 21/32* (2006.01)
*B62D 15/02* (2006.01)

(52) U.S. Cl.
CPC ........... *G01C 21/32* (2013.01); *B62D 15/029* (2013.01)

(58) Field of Classification Search
CPC .. G01C 21/32; G01C 21/3807; B62D 15/029; B62D 15/027; B62D 15/0285; B60W 30/18036; B60W 30/18045
See application file for complete search history.

(56) References Cited

U.S. PATENT DOCUMENTS 9,505,403 B2 *  11/2016  Stefan .................. B60W 30/06
2013/0173148 A1 *  7/2013  Kagawa ................ G01C 21/00
                                                      701/400

FOREIGN PATENT DOCUMENTS

DE    102017114605 A1   1/2019
DE    102017115810 A1   1/2019
EP       3401190 A1    11/2018

OTHER PUBLICATIONS

Translation used of EP 3401180 to Tzempetzis, (Year: 2018).*
Translation of DE 102017114605 to Jauregui , (Year: 2017).*
German Search Report for German Application No. 10 2019 203 187.0, with partial translation, dated Nov. 11, 2019, 8 pages.

* cited by examiner

*Primary Examiner* — Kenneth J Malkowski
(74) *Attorney, Agent, or Firm* — RatnerPrestia

(57) ABSTRACT

A parking assistance apparatus for aiding a driver of a motor vehicle with a parking process, having an environment recording unit configured to record environment data of the motor vehicle at least during a parking process, having a storage unit configured to at least temporarily store the parking trajectory performed by the driver during the parking process and the recorded environment data, and having a processing unit configured to determine a trained parking trajectory, wherein in order to determine the trained parking trajectory, the processing unit is configured to check the driver-performed parking trajectory for a more efficient parking trajectory.

15 Claims, 1 Drawing Sheet

PARKING ASSISTANCE APPARATUS FOR AIDING A DRIVER OF A MOTOR VEHICLE WITH A PARKING PROCESS

CROSS REFERENCE TO RELATED APPLICATIONS

This application claims priority to German Patent Application No. 10 2019 203 187.0, filed Mar. 8, 2019, the contents of such application being incorporated by reference herein.

FIELD OF THE INVENTION

The invention relates to a parking assistance apparatus for aiding a driver of a motor vehicle with a parking process. The invention further relates to a motor vehicle comprising the parking assistance apparatus and to a corresponding method.

BACKGROUND OF THE INVENTION

In modern vehicles, driver assistance systems are increasingly being used to aid the driver while driving. For example, there are known parking assistance systems that carry out a parking process in an assisting or autonomous manner. One modern parking function is "Trained Parking", which first learns a trajectory when the driver performs the parking process for the first time and, if the parking maneuver is repeated, independently travels the learned trajectory, where possible. However, the drawback is the automatic establishment of the trajectory initially traveled by the driver. For example, it is not uncommon for the driver to make a driving error during the parking process and to therefore have to carry out corrective movements. The unnecessary corrective movements are stored in the Trained Parking system and are consequently performed in the trained parking maneuver. Traveling the flawed trajectory costs time, and consequently the driver's experience of greater convenience is limited or nil in comparison with the parking maneuver performed by the driver.

SUMMARY OF THE INVENTION

An aspect of the invention is a motor vehicle and a method that achieve an improved trained parking maneuver.

Proposed is a parking assistance apparatus for aiding a driver of a motor vehicle with a parking process. In particular, the parking assistance apparatus is a trained parking assistance apparatus configured to carry out a trained parking process for a certain parking zone or, in other words, in particular to independently park and/or unpark along a learned parking trajectory. The parking zone is, for example, a parking lot, a parking space, a garage or a parking structure.

The parking assistance apparatus comprises an environment recording unit configured to record environment data of the motor vehicle at least during the parking process. Preferably the environment data comprises information on the surrounding area of the motor vehicle in the parking zone in which the manual or trained parking process takes place. The environment recording unit is, for example, an ultrasound, camera, radar and/or lidar unit.

The parking assistance apparatus comprises a storage unit configured to at least temporarily store the parking trajectory performed by the driver during the parking process and the recorded environment data. To temporarily store is understood to mean, for example, to store for a limited time until it is determined that the data is no longer required, for example the corresponding parking zone has not been driven in for a certain period of time or the parking trajectory is to be overwritten by a new parking trajectory. For example, the data is stored in a look-up table in which the environment data and the driver-performed parking trajectory are assigned to the corresponding parking zone.

Furthermore, the parking assistance apparatus comprises a processing unit that is in particular configured to analyze the stored environment data and the driver-performed parking trajectory.

It should be noted that the processing unit may be electronic circuitry, a circuit, an arithmetic unit, a control device, a processor or a controller. Furthermore, the processing unit may comprise a storage unit, or the storage unit, that stores the data required and/or generated by the processing unit.

The processing unit is configured to determine a trained parking trajectory. Particularly preferably, the trained parking trajectory is determined on the basis of the driver-performed parking trajectory. The trained parking trajectory is preferably understood to mean a parking trajectory which is learned for the corresponding parking zone and along which the motor vehicle is independently parked and/or unparked. When the trained parking trajectory is being determined, the processing unit is in a learning mode, for example. The learning mode may be, for example, activated by the driver via a user interface, such as a smartphone or a center console of the motor vehicle.

Preferably the parking assistance apparatus comprises a control unit that is suitable for performing, or configured to perform, the trained parking trajectory. When the trained parking trajectory is being performed, the control unit is, for example, in a parking mode that may be manually activated, for example, by the driver via a user interface, or may alternatively be automatically activated by means of recognition of the corresponding parking zone. The user interface is understood in particular to mean a human-machine interface, also known as an HMI.

According to the invention, in order to determine the trained parking trajectory, the processing unit is configured to check the driver-performed parking trajectory for a more efficient parking trajectory.

Checking the driver-performed parking trajectory allows poorly taught-in parking trajectories to be corrected without the driver having to discard the originally trained parking trajectory and repeat the parking trajectory without error. Consequently, the parking assistance apparatus allows considerably greater convenience for the driver because unnecessary parking movements are avoided, and a shorter parking process is thus achieved.

Determining the trained parking trajectory on the basis of the driver-performed parking trajectory has the advantage that the parking trajectory that the driver desires is fundamentally achieved. Moreover, the driver-performed parking trajectory does not have to be recalculated, only optimized, which is associated with considerably less processing overhead, and the trained parking trajectory can thus be provided quickly and reliably. The additional convenience achieved thereby boosts the driver's acceptance of the parking assistance apparatus.

The driver-performed parking trajectory and the trained parking trajectory may each be stored; alternatively, by way of example, the driver-performed parking trajectory may be replaced by the trained parking trajectory to save storage space. Furthermore, it is conceivable for a plurality of more efficient parking trajectories to be evaluated. In this case, it is possible, for example, for all of the parking trajectories evaluated as more efficient to be stored, or for only the parking trajectory evaluated as the most efficient to be stored. Thus, at least one or exactly one more efficient parking trajectory is evaluated, provided that it is possible to perform the driver-performed parking trajectory more efficiently. For example, the efficiency check is performed and the determined parking trajectory is stored as soon as the driver-performed parking trajectory is complete.

Preferably the trained parking trajectory is considered to have been determined when the efficiency check for the driver-performed parking trajectory is complete. Particularly preferably the determined parking trajectory is the at least one parking trajectory evaluated as more efficient. If a more efficient parking trajectory has not been determined, the determined parking trajectory is in particular the driver-performed parking trajectory.

According to a preferred further development, the processing unit is configured to determine a more efficient parking trajectory if it is possible to perform a parking trajectory that is shorter in terms of time and/or distance in comparison with the driver-performed parking trajectory.

Furthermore, in order to determine a more efficient parking trajectory, the processing unit is preferably configured to compare the driver-performed parking trajectory with a space in which it is possible to freely maneuver, said space having been evaluated from the recorded environment data.

For the comparison or for the efficiency check, the processing unit is preferably configured to generate a virtual map at least from the recorded environment data and from odometry data of the motor vehicle. Preferably the generated virtual map comprises at least the following information:
- objects which, for the motor vehicle, restrict a space in which it is possible to freely maneuver, for example a wall, parking vehicles, curbs or streetlights, optionally parking markings in addition;
- the driver-performed parking trajectory;
- the relative position of the objects to one another and to the current position of the motor vehicle.

In a first possible embodiment, the processing unit is configured, for example, to output the determined trained parking trajectory to the control unit, which is in particular configured to perform the trained parking trajectory in the parking mode in an automated manner.

In a second, preferred embodiment, the processing unit is configured to offer the determined parking trajectory, specifically the parking trajectory determined to be more efficient, to the driver as a parking option before it is established as a trained parking trajectory for the trained parking process.

Thus, the driver first has to confirm that the determined parking trajectory will be performed, specifically that the driver's parking trajectory will be replaced by the parking trajectory determined to be more efficient. This has the advantage, for example, that the driver does not feel ignored in deciding on the performed parking trajectory.

According to a preferred further development, the parking assistance apparatus comprises or is connected, or is connectable, to a user interface, the user interface allowing the driver to select or deselect at least one or more portions or the entirety of the determined parking trajectory. In this way, the driver can reject the offered parking trajectory or at least a portion thereof. This may be advantageous if the processing unit has recognized an area in which it is certainly possible to drive, but said area is a special area, such as private property, and driving in said area should be avoided.

The invention further relates to a motor vehicle comprising a parking assistance apparatus according to the preceding description.

The invention further relates to a method for aiding a driver of a motor vehicle with a parking process, in particular a trained parking process. The method comprises the following steps:
- recording environment data of the motor vehicle at least during a parking process,
- at least temporarily storing the parking trajectory performed by the driver during the parking process and the recorded environment data,
- determining a trained parking trajectory for a trained parking process in particular on the basis of the driver-performed parking trajectory, the driver-performed parking trajectory being checked for a more efficient parking trajectory in order to determine the trained parking trajectory.

The invention further relates to a computer program element, which, when executed on a processing unit of a parking assistance apparatus, instructs the parking assistance apparatus to carry out the above-described method.

Further features, advantages and effects of the invention will emerge from the following description of preferred exemplary embodiments of the invention.

BRIEF DESCRIPTION OF THE DRAWINGS

Aspects of the invention will be explained in greater detail with reference to exemplary embodiments depicted in the drawings as appended.

DETAILED DESCRIPTION OF THE PREFERRED EMBODIMENTS

Figure 1:
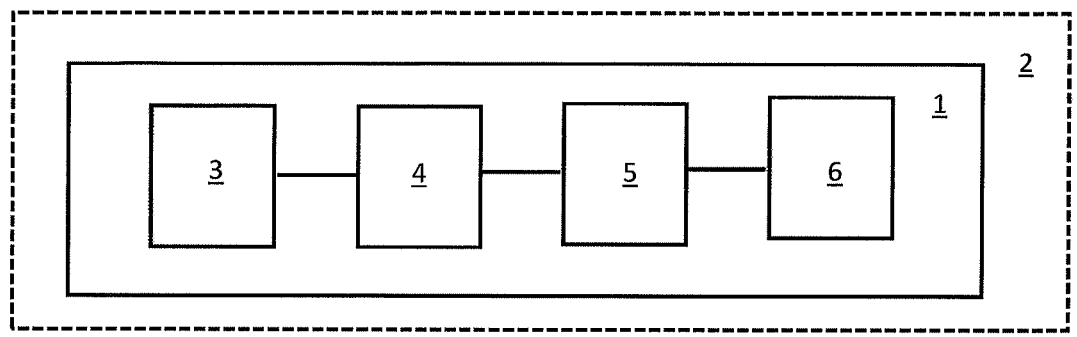
FIG. 1 is a schematic view of a parking assistance apparatus for performing a trained parking process.

FIG. 1 shows a parking assistance apparatus 1 for aiding a driver of a motor vehicle 2 with a parking process. The parking assistance apparatus 1 comprises an environment recording unit 3 and a storage unit 4. The environment recording unit 3 records environment data on the surroundings of the motor vehicle 2 at least during a parking process. The environment recording unit 3 may comprise, for example, a camera, a radar sensor, an ultrasound sensor or a lidar sensor. The storage unit 4 obtains the environment data recorded by the environment recording unit 3 and at least temporarily stores said data. Moreover, the storage unit 4 at least temporarily stores the parking trajectory 8 performed by the driver during the parking process.

The parking assistance apparatus 1 comprises a processing unit 5 that determines a trained parking trajectory 7 preferably on the basis of the driver-performed parking trajectory 8. Furthermore, in this exemplary embodiment, the parking assistance apparatus 1 comprises a control unit 6 that performs the trained parking trajectory 7, for example automatically or as a result of a command input from the driver.

In order to determine the trained parking trajectory 7, the processing unit 5 checks the driver-performed parking trajectory 8 for a more efficient parking trajectory. Thus, it is in particular checked whether it is possible to perform the driver-performed parking trajectory 8 in a manner that is shorter in terms of time and/or distance, specifically whether driving errors 10 were made and can be removed in the trained parking trajectory 7. In this way, it is in particular ensured that no additional, unnecessary driving movements are stored in the trained trajectory 7. Preferably the trained parking trajectory 7 is determined and, optionally, additionally established as soon as the check by the processing unit 6 is complete.

Figure 2:
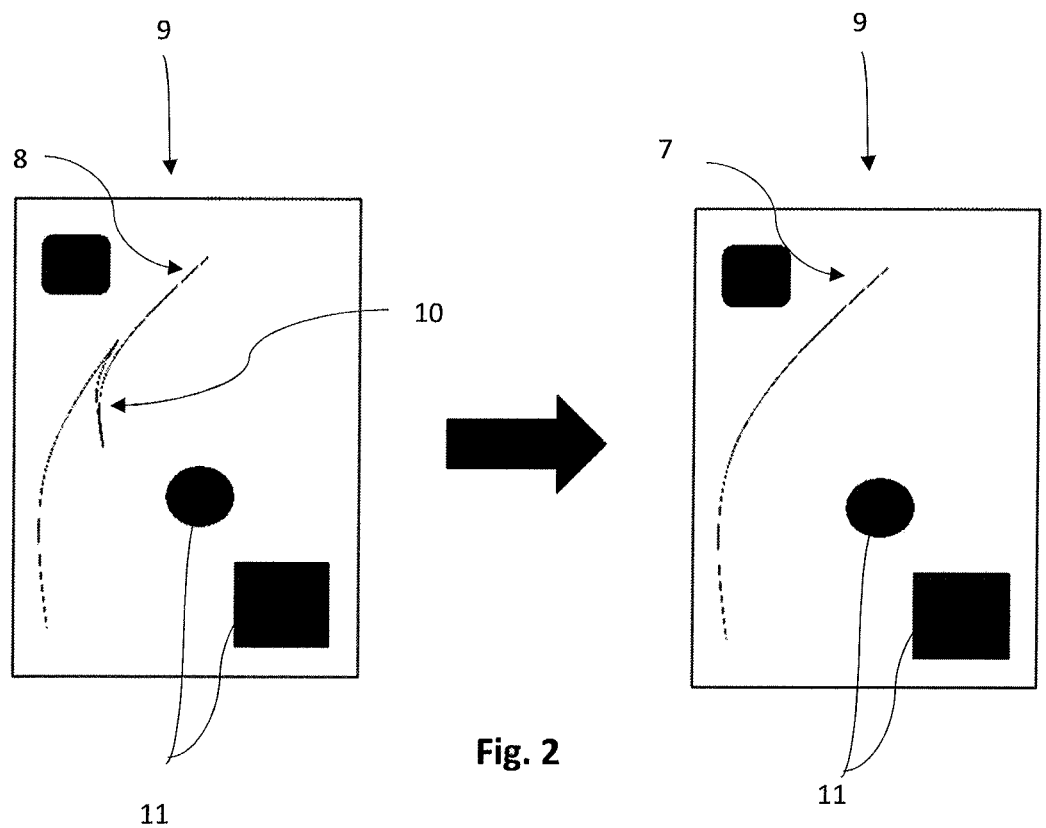
FIG. 2 is a schematic view of a virtual map comprising a trained parking trajectory determined by the parking assistance apparatus from FIG. 1.

Merely for illustrative purposes and by way of example, FIG. 2 shows a virtual map 9 of a parking zone, said map having been generated by the processing unit 5. The virtual maps 9 are created using the recorded environment data and odometry data of the motor vehicle 2. The virtual map 9 comprises objects 11 which, for the motor vehicle 2, restrict a space in which it is possible to freely maneuver, said objects having been recorded by the environment recording unit 3. Moreover, the virtual map 9 comprises the driver-performed parking trajectory 8 on the left-hand side and the trained parking trajectory 7 on the right-hand side. Furthermore, the virtual map 9 comprises the relative position of the objects 11 to one another and to the current position of the motor vehicle 2 (not shown).

In this exemplary embodiment, the driver-performed parking trajectory 8 comprises an unnecessary corrective movement 10. The processing unit 5 has checked the driver-performed parking trajectory 8 for efficiency and has evaluated the unnecessary corrective movement 10 on the basis of the recorded environment data. The determined trained parking trajectory 7 is shorter than the driver-performed parking trajectory 8 in terms of distance and thus forms a more efficient parking maneuver.

If, however, the driver-performed parking trajectory 8 does not comprise a corrective movement 10 or another maneuvering error, or a more efficient parking trajectory has not been determined either, the processing unit 5 preferably establishes or proposes the driver-performed parking trajectory 8 as a trained parking trajectory 7.

LIST OF REFERENCE NUMERALS 1 parking assistance apparatus
2 motor vehicle
3 environment recording unit
4 storage unit
5 processing unit
6 control unit
7 trained parking trajectory
8 driver-performed parking trajectory
9 virtual map of a parking zone
10 driving error

The invention claimed is:

1. A parking assistance apparatus for aiding a driver of a motor vehicle with a parking process, comprising:
   a sensor, of the motor vehicle, configured to record environment data of the motor vehicle during a parking process in an environment;
   a memory device, of the motor vehicle, configured to temporarily store a parking trajectory performed by the driver during the parking process and the recorded environment data; and
   a processor, of the motor vehicle, configured to:
      check the driver-performed parking trajectory for a more efficient parking trajectory,
      analyze the driver-performed parking trajectory with respect to the recorded environment and detect a driving error in the driver-performed parking trajectory with respect to the recorded environment,
      determine a trained parking trajectory with respect to the recorded environment by adjusting the driver-performed parking trajectory based on the driving error,
      recognize an area that should be avoided,
      produce a modified trained parking trajectory based on instructions from the driver, via a user interface, rejecting at least a portion of the trained parking trajectory that includes the area that should be avoided, and
      autonomously control the motor vehicle based on the modified trained parking trajectory.

2. The parking assistance apparatus according to claim 1, wherein the processor is configured to determine a more efficient parking trajectory when a parking trajectory that is shorter in terms of time and/or distance in comparison with the driver-performed parking trajectory is performable.

3. The parking assistance apparatus according to claim 1, wherein in order to determine a more efficient parking trajectory, the processor is further configured to compare the driver-performed parking trajectory with a space in which it is possible to freely maneuver, said space having been evaluated from the recorded environment data.

4. The parking assistance apparatus according to claim 3, wherein for the comparison, the processor is further configured to generate a virtual map from the recorded environment data and odometry data of the motor vehicle.

5. The parking assistance apparatus according to claim 4, wherein the virtual map comprises at least the following information:
   objects which, for the motor vehicle, restrict a space in which it is possible to freely maneuver;
   the trained parking trajectory;
   the relative position of the objects to one another and to the current position of the motor vehicle.

6. The parking assistance apparatus according to claim 1, wherein the processor is further configured to offer the driver the parking trajectory determined to be more efficient as a parking option before it is established as a trained parking trajectory.

7. The parking assistance apparatus according to claim 6, wherein the parking assistance apparatus comprises or is connectable to the user interface, the user interface allowing the driver to select or reject the entirety or merely one or more portions of the parking trajectory determined to be more efficient.

8. A motor vehicle comprising a parking assistance apparatus according to claim 1.

9. A method for aiding a driver of a motor vehicle with a parking process, comprising:
   recording, by a sensor of the motor vehicle, environment data of the motor vehicle at least during a parking process in an environment;
   temporarily storing, by a memory device of the motor vehicle, the parking trajectory performed by the driver during the parking process and the recorded environment data;
   checking, by a processor of the motor vehicle, the driver-performed parking trajectory for a more efficient parking trajectory;
   analyzing, by the processor of the motor vehicle, the driver-performed parking trajectory with respect to the recorded environment and detecting a driving error in the driver-performed parking trajectory with respect to the recorded environment;
   determining, by the processor of the motor vehicle, a trained parking trajectory with respect to the recorded environment by adjusting the driver-performed parking trajectory based on the driving error;

recognizing, by the processor of the motor vehicle, an area that should be avoided;

producing, by the processor of the motor vehicle, a modified trained parking trajectory based on instructions from the driver, via a user interface, rejecting at least a portion of the trained parking trajectory that includes the area that should be avoided; and autonomously controlling the motor vehicle based on the modified trained parking trajectory.

10. A computer program element, which, when executed on a processor of a parking assistance apparatus, instructs the parking assistance apparatus to carry out the method according to claim 9.

11. The parking assistance apparatus according to claim 2, wherein in order to determine a more efficient parking trajectory, the processor is further configured to compare the driver-performed parking trajectory with a space in which it is possible to freely maneuver, said space having been evaluated from the recorded environment data.

12. The parking assistance apparatus according to claim 1, wherein the driving error is a corrective maneuver of the motor vehicle that is performed by the driver during the parking process.

13. The method according to claim 9, wherein the driving error is corrective maneuver of the motor vehicle that is performed by the driver during the parking process.

14. The parking assistance apparatus according to claim 1, wherein the area that should be avoided is a private property.

15. The method according to claim 9, wherein the area that should be avoided is a private property.

* * * * *